United States Patent
Barry et al.

(10) Patent No.: US 9,552,056 B1
(45) Date of Patent: Jan. 24, 2017

(54) GESTURE ENABLED TELEPRESENCE ROBOT AND SYSTEM

(75) Inventors: Daniel T. Barry, South Hadley, MA (US); Zhengqin Fan, San Jose, CA (US); Alaina L. Hardie, Toronto (CA)

(73) Assignee: FELLOW ROBOTS, INC., San Jose, CA (US)

( * ) Notice: Subject to any disclaimer, the term of this patent is extended or adjusted under 35 U.S.C. 154(b) by 209 days.

(21) Appl. No.: 13/586,732

(22) Filed: Aug. 15, 2012

Related U.S. Application Data

(60) Provisional application No. 61/528,150, filed on Aug. 27, 2011, provisional application No. 61/532,481, filed on Sep. 8, 2011.

(51) Int. Cl.
  *G06F 3/01* (2006.01)
  *B25J 9/16* (2006.01)
  *G06K 9/00* (2006.01)

(52) U.S. Cl.
  CPC .............. *G06F 3/01* (2013.01); *B25J 9/1689* (2013.01); *G06K 9/00268* (2013.01)

(58) Field of Classification Search
  CPC .............. G06K 9/46; G06K 9/00; B25J 13/08; G09G 5/00; G06F 3/14; G06T 2207/30216
  See application file for complete search history.

(56) References Cited

U.S. PATENT DOCUMENTS

| | | | |
|---|---|---|---|
| 4,354,252 A | 10/1982 | Lamb et al. | 340/502 |
| 4,638,445 A | 1/1987 | Mattaboni | 701/23 |
| 4,890,241 A | 12/1989 | Hoffman et al. | 700/255 |
| 4,939,728 A | 7/1990 | Markkula et al. | 370/419 |
| 5,293,639 A | 3/1994 | Wilson et al. | 455/17 |
| 6,292,713 B1* | 9/2001 | Jouppi | G06F 3/011 345/629 |
| 6,347,261 B1* | 2/2002 | Sakaue | B25J 9/1694 345/156 |
| 7,461,156 B2 | 12/2008 | Haupt et al. | 709/228 |
| 7,609,686 B1 | 10/2009 | McNamara et al. | 370/356 |
| 7,702,739 B1 | 4/2010 | Cheng et al. | 709/207 |
| 7,801,959 B1 | 9/2010 | Lennie et al. | 709/206 |
| 7,827,459 B1 | 11/2010 | Zhou et al. | 714/749 |

(Continued)

OTHER PUBLICATIONS

By Broccia, G., Livesu, M., & Scateni, R. (2011). Gestural Interaction for Robot Motion Control. In Eurographics Italian Chapter Conference (pp. 61-66).*

(Continued)

*Primary Examiner* — Thomas G Black
*Assistant Examiner* — Ana Thomas
(74) *Attorney, Agent, or Firm* — Hayes Soloway P.C.

(57) ABSTRACT

A telepresence robot includes a mobile platform, a camera, and a computer in communication with the platform and the camera. The computer receives video information from a remotely located camera relating to a gesture made by a remote human operator, and the robot is configured to operate based on the gesture. The computer may further predict an emotional state of a person interacting with the robot, based on video information received from the robot camera. A telepresence robot system includes: a telepresence robot having a mobile platform, a robot camera, a robot display, and a robot computer; and a control station, located remote to the robot, having a control station camera, a control station display, and a control station computer.

23 Claims, 9 Drawing Sheets

(56) References Cited

U.S. PATENT DOCUMENTS

| | | | |
|---|---|---|---|
| 8,046,744 B1 | 10/2011 | Marshall et al. | 717/128 |
| 8,050,684 B2 | 11/2011 | Lewis et al. | 455/445 |
| 8,407,306 B1 | 3/2013 | Nerieri et al. | 709/206 |
| 8,619,799 B1 | 12/2013 | Thodupunoori et al. | 370/401 |
| 8,700,722 B1 | 4/2014 | Sharma et al. | 709/206 |
| 8,965,762 B2* | 2/2015 | Song | G06K 9/00268 382/118 |
| 9,191,619 B2* | 11/2015 | Liu | H04N 7/157 |
| 2002/0071427 A1 | 6/2002 | Schneider et al. | 370/352 |
| 2002/0160805 A1 | 10/2002 | Laitinen et al. | 455/550 |
| 2002/0165790 A1 | 11/2002 | Bancroft et al. | 705/26 |
| 2004/0164696 A1 | 8/2004 | Yourlo et al. | 318/568.11 |
| 2006/0047665 A1 | 3/2006 | Neil | 707/10 |
| 2006/0071929 A1 | 4/2006 | Stinis et al. | 345/213 |
| 2006/0105792 A1 | 5/2006 | Armbruster et al. | 455/517 |
| 2006/0106471 A1 | 5/2006 | Ikeda et al. | 700/83 |
| 2006/0178559 A1 | 8/2006 | Kumar et al. | 600/109 |
| 2006/0190526 A1 | 8/2006 | Neil et al. | 709/203 |
| 2006/0258287 A1 | 11/2006 | Bidet et al. | 455/41.2 |
| 2007/0069014 A1 | 3/2007 | Heckel et al. | 235/383 |
| 2007/0100951 A1 | 5/2007 | Bae | 709/206 |
| 2007/0123307 A1 | 5/2007 | Adams et al. | 455/566 |
| 2007/0130255 A1 | 6/2007 | Wolovitz et al. | 709/204 |
| 2007/0156817 A1 | 7/2007 | Daffner et al. | 709/206 |
| 2007/0162582 A1 | 7/2007 | Belali et al. | 709/223 |
| 2007/0299918 A1 | 12/2007 | Roberts | 709/206 |
| 2008/0080370 A1 | 4/2008 | Willey | 370/229 |
| 2008/0109519 A1 | 5/2008 | Aaltonen et al. | 709/206 |
| 2008/0140789 A1 | 6/2008 | Mulligan et al. | 709/206 |
| 2008/0244040 A1 | 10/2008 | Bhatia et al. | 709/219 |
| 2008/0305775 A1 | 12/2008 | Aaltonen et al. | 455/412.1 |
| 2009/0047929 A1 | 2/2009 | Chesnutt et al. | 455/411 |
| 2009/0055019 A1* | 2/2009 | Stiehl | B25J 9/1671 700/249 |
| 2009/0163244 A1 | 6/2009 | Parkkinen et al. | 455/558 |
| 2009/0209250 A1 | 8/2009 | Huq | 455/425 |
| 2009/0281880 A1 | 11/2009 | Lee | 705/11 |
| 2010/0070588 A1 | 3/2010 | Sinn et al. | 709/206 |
| 2010/0094461 A1 | 4/2010 | Roth et al. | 700/251 |
| 2010/0094985 A1 | 4/2010 | Abu-Samaha et al. | 709/223 |
| 2010/0131103 A1 | 5/2010 | Herzog et al. | 700/259 |
| 2010/0150171 A1 | 6/2010 | Rodbro et al. | 370/468 |
| 2010/0238262 A1* | 9/2010 | Kurtz | H04N 7/142 348/14.01 |
| 2010/0245532 A1* | 9/2010 | Kurtz | G06K 9/00711 348/14.03 |
| 2010/0314226 A1 | 12/2010 | Patel et al. | 200/237 |
| 2011/0071676 A1 | 3/2011 | Sanders et al. | 700/250 |
| 2011/0087571 A1 | 4/2011 | Sagi et al. | 705/34 |
| 2011/0125856 A1 | 5/2011 | Chu et al. | 709/206 |
| 2011/0158476 A1* | 6/2011 | Fahn | G06K 9/00288 382/103 |
| 2011/0173621 A1 | 7/2011 | Meijer et al. | 718/102 |
| 2011/0213657 A1 | 9/2011 | O'Malley et al. | 705/14.49 |
| 2011/0225578 A1 | 9/2011 | Lauwers et al. | 717/176 |
| 2011/0231050 A1 | 9/2011 | Goulding | 701/26 |
| 2011/0238211 A1 | 9/2011 | Shirado et al. | 700/246 |
| 2011/0288684 A1* | 11/2011 | Farlow | B25J 11/009 700/264 |
| 2011/0307403 A1 | 12/2011 | Rostampour et al. | 705/325 |
| 2012/0033605 A1 | 2/2012 | Yang et al. | 370/312 |
| 2012/0042028 A1 | 2/2012 | Langoulant et al. | 709/206 |
| 2012/0069131 A1 | 3/2012 | Abelow | 348/14.01 |
| 2012/0122425 A1 | 5/2012 | Adams et al. | 455/412.1 |
| 2012/0185547 A1 | 7/2012 | Hugg et al. | 709/206 |
| 2012/0239196 A1* | 9/2012 | Olivier, III | B25J 9/1689 700/259 |
| 2012/0284397 A1 | 11/2012 | Cheng | 709/224 |
| 2012/0303774 A1 | 11/2012 | Wilson et al. | 709/223 |
| 2012/0311046 A1 | 12/2012 | Grigoriev | 709/206 |
| 2012/0315879 A1 | 12/2012 | Vrbaski et al. | 455/412.1 |
| 2013/0007299 A1 | 1/2013 | German et al. | 709/237 |
| 2013/0047034 A1 | 2/2013 | Salomon et al. | 714/18 |
| 2013/0050743 A1 | 2/2013 | Steely et al. | 358/1.15 |
| 2013/0111572 A1 | 5/2013 | Gaddam et al. | 726/7 |
| 2013/0120547 A1 | 5/2013 | Linnell | 348/61 |
| 2013/0173727 A1 | 7/2013 | Libin et al. | 709/206 |
| 2013/0179514 A1 | 7/2013 | Arora et al. | 709/206 |
| 2013/0212203 A1 | 8/2013 | Park et al. | 709/206 |
| 2013/0231779 A1 | 9/2013 | Purkayastha et al. | 700/259 |
| 2014/0009561 A1 | 1/2014 | Sutherland et al. | 348/14.05 |
| 2014/0095216 A1 | 4/2014 | Radhakrishnan | 705/5 |
| 2014/0184423 A1 | 7/2014 | Mensinger et al. | 340/870.09 |
| 2014/0270115 A1 | 9/2014 | Burnett et al. | 79/88.12 |
| 2014/0304238 A1 | 10/2014 | Halla-Aho et al. | 707/692 |
| 2015/0246654 A1* | 9/2015 | Tadic | B60W 40/09 340/436 |

OTHER PUBLICATIONS

Yim, Ji-Young and Chris Shaw, "Design Consideration of Expressive Didirectional Telepresence Robots", CHI 2011, May 7-12, 2011.*

Lixia Zhang, *VirtualClock:A New Traffic Control Algorithm for Packet Switching Networks*, ACM SIGCOMM Computer Communication Review, 1990, pp. 19-29.

Campbell et al., "The Message Session Relay Protocol (MSRP)", RFC 4975, 2007 (64 pgs).

Campbell et al., "The Message Session Relay Protocol", 2005 (58 pgs).

International Search Report and Written Opinion issued in application No. PCT/US15/57392, dated Jan. 12, 2016 (10 pgs).

Libin et al., U.S. Appl. No. 61/580,907, Dec. 28, 2011 (4 pgs).

Notice of Allowance issued in U.S. Appl. No. 13/896,162, dated Jul. 31, 2015 (33 pgs).

Office Action issued in U.S. Appl. No. 13/586,732, dated Jun. 6, 2014 (24 pgs).

Office Action issued in U.S. Appl. No. 13/586,732, dated Mar. 20, 2015 (26 pgs).

Office Action issued in U.S. Appl. No. 13/586,732, dated Sep. 30, 2015 (23 pgs).

Office Action issued in U.S. Appl. No. 13/896,162, dated Jan. 22, 2015 (22 pgs).

* cited by examiner

Fig. 4a
Fig. 4b
Fig. 4c
Fig. 4d
Infrared heat distribution emotional states

GESTURE ENABLED TELEPRESENCE ROBOT AND SYSTEM

CROSS REFERENCE TO RELATED APPLICATIONS

This application claims priority from U.S. Provisional Application Ser. No. 61/528,150, filed Aug. 27, 2011 and U.S. Provisional Application Ser. No. 61/532,481, filed Sep. 8, 2011, the contents of which are incorporated herein in their entireties.

FIELD

The present disclosure is generally related to a gesture-enabled telepresence robot and system. The invention has particular utility in connection with gesture-based control of telepresence robots and will be described in connection with such utility, although other utilities are contemplated.

BACKGROUND

Known telepresence robots generally suffer a variety of issues. They are often very expensive, heavy and difficult to ship, require remote setup often involving skilled information technology assistance, incorporate proprietary hardware and/or software, provide low quality video and voice communications, and require frequent maintenance by skilled technicians.

While there has been a substantial amount of research in the field, mobile telepresence remains very expensive. Moreover, each device and even component devices that make up the telepresence robot are often unique and specific to a particular use, and that has substantially limited their use.

Traditionally, telepresence robots have been controlled using a joystick, a mouse or some similar input device. However, such input requires a human operator to communicating the robot in ways similar to how humans naturally interact with other humans, e.g. using body language, gestures and recognizing emotions.

Furthermore, telepresence robots and systems are typically limited to sensing in two dimensions only, and control of telepresence robots is typically limited to two dimensional controls.

Currently there is no central repository for gesture-based communication that crosses all platforms. Even for a single device, such as the Microsoft Kinect, there are very few common gestures; each interface design defines its own unique set.

SUMMARY

Embodiments of the present disclosure provide a gesture-enabled telepresence robot and telepresence system for controlling a telepresence robot with human gestures. In one aspect, the disclosure provides a telepresence robot having a mobile platform, a camera, and a computer in communication with the platform and the camera. The computer has a processor and computer-readable memory, and the computer is configured to receive video information from a remotely located camera relating to a gesture made by a remote human operator, and the robot is configured to operate based on the gesture.

The computer may be further configured to predict an emotional state of the person based on video information received from the camera and/or information relating to the person received from, e.g., an infrared camera, and/or a biometric sensor.

The telepresence robot may further include a robot display, a robot microphone, and a robot speaker, and the computer may be in communication with the display, microphone and speaker.

The telepresence robot may further include a 3D sensor, which may be a 3D video camera, a laser rangefinder, a 3D scanner, a structured light scanner, stereo cameras, an ultrasound sensor, a radar detector, a Doppler radar sensor, and/or a lidar detector.

The telepresence robot computer may be configured to receive video information from a remotely located camera and audio information from a remotely located microphone, and to display the received video information on the robot display, project the received audio information from the speaker, and to transmit information received from the robot camera and the robot microphone to a remotely located computer.

The telepresence robot may further include a robot location detector. The computer-readable memory of the robot may be configured to store scheduling information for the robot. The scheduling information may include time and location information, and the robot computer may be configured to access the scheduling information and to cause the robot to navigate to a specified location at a specified time based on the scheduling information.

In a further aspect, the present disclosure provides a telepresence robotic system including: a telepresence robot having a mobile platform, a robot camera, a robot display, and a robot computer in communication with the platform and the robot camera, the robot computer having a processor and computer-readable memory; and a control station located remote to the robot, the control station having a control station camera, a control station display, and a control station computer in communication with the control station camera and control station display, the control station computer having a processor and computer-readable memory. The control station camera may be configured to detect video information relating to a gesture made by a human operator, and the robot may be configured to operate based on the detected gesture.

The control station computer may be configured to receive video information from the control station camera relating to the human operator and to predict an emotional state of the operator based on the received information.

The control station may further include an infrared camera and/or a biometric sensor, and the control station computer may be configured to receive information from the infrared camera and/or biometric sensor relating to the human operator and to predict an emotional state of the operator based on the information received from the control station camera and the infrared camera and/or biometric sensor.

The control station may further include a 3D sensor, which may be a 3D video camera, a laser rangefinder, a 3D scanner, a structured light scanner, stereo cameras, an ultrasound sensor, a radar detector, a Doppler radar sensor, and/or a lidar detector.

The control station computer may be configured to receive video information from a remotely located robot camera and audio information from a remotely located robot microphone, and to display the received video information on the control station display, project the received audio information from a control station speaker, and to transmit information received from the control station camera and a control station microphone to a remotely located robot computer.

In another aspect, the disclosure provides a telepresence robot system including: a telepresence robot having a mobile platform, a robot camera, a biometric sensor, a robot display, and a robot computer in communication with the platform and the robot camera, the robot computer having a processor and computer-readable memory; and a control station located remote to the robot, the control station having a control station camera, a control station display', and a control station computer in communication with the control station camera and control station display, the control station computer having a processor and computer-readable memory. The control station computer receives video information from the robot camera and displays the received video information on the control station display, and the control station computer may be configured to receive an input signal relating to a selection of a particular location on the control station display, and the robot may be configured to navigate to a particular location based on the selection.

The present disclosure provides telepresence robots and systems that allow an operator, for example, to remotely visit a factory or assembly facility for inspection or training, to interact with investigators within a remote laboratory setting, or to attend distant meetings without travel.

Moreover, the present disclosure allows for remote presence at home for a variety of applications, such as: 1) security when the home is empty; 2) family members who are traveling; and 3) visits with extended family who live elsewhere. Additional applications may include remote presence at meetings in lieu of travel, exploring foreign cities and immersion language studies, interactive classrooms where students can mingle with other students and faculty, remote attendance at work for people who are unable to easily travel due to distance or disability.

The features, functions, and advantages that have been discussed can be achieved independently in various embodiments of the present disclosure or may be combined in yet other embodiments further details of which can be seen with reference to the following description and drawings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is an illustration of camera views and corresponding infrared camera views of a person in various emotional states, in accordance with an embodiment of the disclosure.

DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many aspects of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multiprocessor systems, processor-based or programmable consumer electronics, network computers, minicomputers) and the like.

Some aspects of the invention may also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

Figure 1:
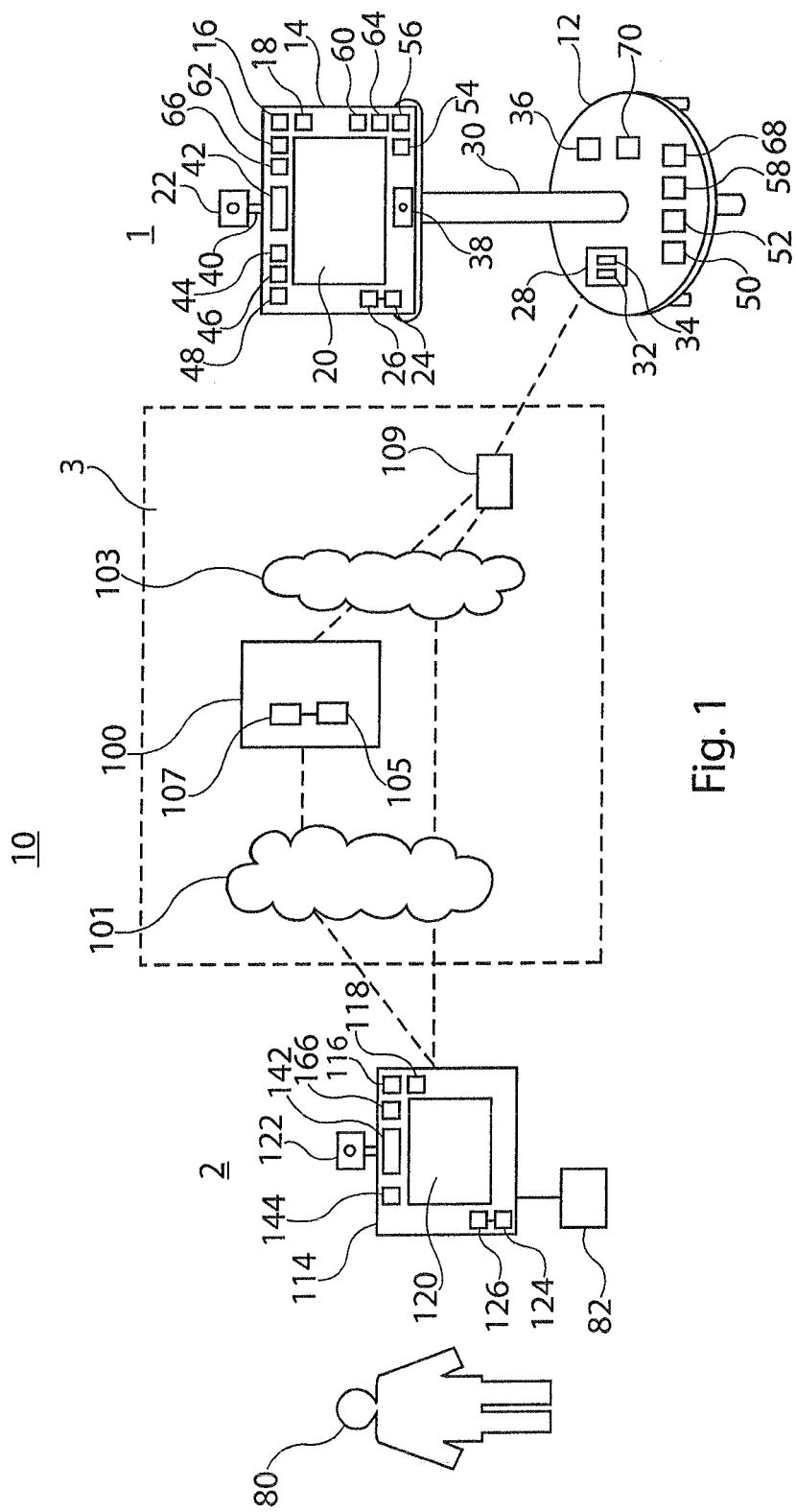
FIG. 1 is an illustration of a block diagram of a telepresence robotic system, in accordance with a first exemplary embodiment of the disclosure.

FIG. 1 is an illustration of a block diagram of a telepresence robotic system 10, in accordance with a first exemplary embodiment of the disclosure. The system 10 includes a control station 2, a telepresence robot 1, and a network 3.

Robot:

The telepresence robot may be any type of robot, telerobot, or the like which is capable of sensing or detecting some element and communicating with a remotely located control station. The telepresence robot 1 may include a locomotion platform 12, a robot computer 14, a robot camera 22, a microphone 16, a speaker 18, and a robot display 20. Further, the telepresence robot 1 may include a structure 30 which connects the mobile platform 12 to the robot display 20. The robot computer 14 and robot camera 22 may also be attached to the structure 30.

The locomotion platform 12 allows the robot 1 to move. The platform 12 may be, for example, any known, commercially-available platform such as the iRobot Create. Such known, commercially-available platforms provide the advantages of low cost, autonomous docking, and easy modularity. However, the low cost commercial platforms tend to be too small to be stable for a tall telepresence robot. Thus, a larger, more stable platform 12 may be provided. Alternatively, the base of an existing commercial platform may be extended to achieve reliability and stability. The locomotion platform 12 may have, for example, three or more wheels, thus allowing the robot to move in any direction. The robot 1 may be at least five feet tall, in order to produce an optimal sense of presence. The height of the structure 30 may be adjustable. For example, the structure 30 may be a telescoping pole or other adjustable structure, and may thus allow the height of the robot 1 to change in order to provide any desired height and view from the robot camera 22.

The computer 14 may utilize any known operating system. In one embodiment, the computer 14 is a single board computer (SBC) that uses Ubuntu operating system and includes a single 12V power supply. The SBC may be a single-voltage board, or it may require multiple voltages. The SBC may be driven by a custom-designed power board, since regulated supplies may be required for other elements and/or devices of the robot 1 and that would reduce the cost of the SBC. The approach involves adding additional voltage outputs to the board. It also reduces modularity, though not too much, as the required voltages and connectors are generally standardized.

The computer 14 further includes a processor 24, which has sufficient processing power to run a variety of software which may be used by the computer 14, including for example, Willow Garage Robot Operating System (ROS), video processing with OpenCV, and the like.

The robot 1 may further include a power system 28. The power system 28 may include a battery 32 and a charging system 34. The battery 32 may be a rechargeable lead-acid battery. The charging system 34 may include an interface which allows the robot 1 to electrically couple to a home docking station (not shown) for charging. The power system 28 may include power distribution circuitry and components, including regulators, heat dissipation devices, fuses and/or circuit breakers. Furthermore, the power system 28 may include an emergency cut-off circuit which may automatically, or manually, cut power from the robot under certain circumstances, for example if the battery is too hot, if the battery is below a certain minimum threshold charge, or if the robot moves outside of a predefined area.

Battery life may vary significantly depending on how much the user moves the robot. Preferably, the battery type, size and capacity allows for four hours of hard use between charges.

The robot 1 may further include a processor 36 and associated circuitry for the control and sensing interface of the robot 1. The processor 36 may be, for example, an Arduino Mega microcontroller, which allows for easy development along with serial output for controlling the platform 12, and may act as a serial (e.g., via USB) device that provides an interface to the computer 14. The processor 36 may be any processor, microprocessor or microcontroller, and may be a PIC microcontroller, which is generally powerful and allows for high speed USB connections for data transfer. The processor 36 may include or be associated with some amount of computer-readable memory.

One or more cameras may be provided on the telepresence robot 1. A first camera 22 allows the robot 1 to "look" forward for interaction, and a second camera 38 allows the robot 1 to "look" downward to provide obstacle avoidance and targets for movement commands. The first camera 22 may be disposed on a pan and tilt base 40. Any known and/or commercially available pan and tilt base may be used with the present invention. The pan and tilt base 40 is driven by output from the processor 24 (e.g., via power op amps or any other well-known circuitry for such pant and tilt base control), and may be commanded by an operator 80 at the control station 2. The second camera 38 may be provided in a fixed position, or may disposed on a pan and tilt base. In one embodiment, the first camera 22 is disposed on a pan and tilt base 40, while the second camera 38 is provided in a fixed position. The first and second cameras 22, 38 may include features such as zoom, autofocus, and a wide-angle or fisheye lens. In one embodiment, the first camera 22 includes zoom and autofocus features, and the second camera 38 includes a fisheye lens.

The robot 1 includes a display 20 that provides clear views of the operator 80 and/or the control station 2. The display 20 may be any type of computer display, and may preferably be a touch screen or a standard display with a touch pad attached. The display 20 may be integrated into the computer 14, for example as a laptop or tablet computer.

A microphone 16 may also be provided on the robot 1. A directional microphone may be preferable to remove ambient noise in loud environments, thereby allowing the operator 80 to clearly hear a person interacting with, and located in front of, the telepresence robot 1. One or more speakers 18 are also included on the robot 1, for projecting sounds from the remote control station. The correct speaker volume is difficult to predict, especially in environments with high ambient noise, such as crowded rooms. For this reason, powered speakers with remote control may be preferable.

The robot 1 further may include a 3D sensor 42. The 3D sensor 42 may be a 3D video camera, a laser rangefinder, any 3D scanner, structured light scanner, stereo cameras, ultrasound, radar, lidar or any other sensing or scanning devices for detecting 3D static and/or dynamic movements. The 3D sensor 42 may be an infrared structured light-based sensor, such as the Microsoft Kinect, which provides good quality 3D sensing at a comparatively low cost.

Use of 3D sensing may provide autonomous localization and navigation through mapped environments, and autonomous obstacle avoidance through unmapped environments.

Additional sensors may be included on the robot 1. These may include any of: infrared cameras 44 (e.g, for sensing environmental heat sources as well as personal blood flow distribution); radar sensor or Doppler radar sensor 46 (for movement detection and detection of personal respiration and heart rates); tactile sensor 48 which may be piezoresistive, piezoelectric, capacitive and/or electroresistive sensors which may be sensitive to touch, force and/or pressure; cliff sensor 50 which may be an infrared sensor for sensing the presence of a "cliff" or other terrain features; bump sensor 52 which may be a force sensor for sensing when the robot 1 has bumped into an object; humidity sensor 54 which may be a hygrometer for sensing the humidity in the environmental air; chemical sensor 56 which may be a potentiometric sensor for sensing chemical components of an environment; vibration sensor 58 which may be a piezoelectric sensor or accelerometer for sensing vibrations; ultraviolet sensor 60 for sensing ultraviolet radiation; ultrasonic sensor 62 which may be used for detecting people, for detecting the fullness of liquid in a tank (e.g., a fuel tank, etc.), for measuring wind speed and direction, or for any other known uses; and/or a temperature sensor 64 for sensing an environmental temperature and/or for sensing the temperature of the robot computer 14 or any other heat emitting or sensitive component. Each of these additional sensors may communicate with the robot computer 14.

In addition to these areas, any of the above-described sensors, as well as other sensors and/or sensing technologies including, for example, biometric sensors, may be employed to extend the capability of the telepresence robot 1 to sense blood flow, pupillary response or dilation, respiration and heart rate, retinal patterns, and body fluid distribution of an observed person. For example, the camera 22 may detect the person's pupillary dilation and retinal patterns. A retinal scanner 66 may be included on the robot 1 to sense a person's retinal patterns. The infrared camera 44 or other thermal imaging device may sense the person's blood flow and body fluid distribution. The person's respiration may be sensed by the camera 22, for example, and the person's breathing patterns may be determined based on the visible expansion and contraction of the person's chest, or the movements of the person's nostrils while inhaling and exhaling. And, the person's heart rate may be sensed and determined, for example, based on information sensed by the camera 22, infrared camera 44 or electric potential sensors, as heart rate may be determined based on variations in skin brightness, variations in blood flow and/or displacement current using a capacitive coupling. These parameters are helpful in assessing both health and "state-of-mind" of the observed individual.

The robot 1 may further include a robot location detector 68. The robot location detector 68 may utilize any of a number of known location detection techniques, including Global Positioning Systems (GPS) and inertial navigation systems, to detect the location of the robot 1.

The robot 1 also includes a wireless communication device 70, which communicates with the control station computer 114 through the computer network 3. The network 3 may include any number of network-accessible devices. For example, the control station computer 114 may communicate with the robot computer 14 by sending and receiving information through a first network 101, a server 100 having a processor 105 and computer-readable memory 107, a second network 103, a wireless communication device 109 (which may be, for example, a local wireless router), and then to the robot computer 14.

The computer networks 101 and 103 may be any wired or wireless computer network that enables communication between devices, including local area networks (LAN), wide area networks (WAN), the Internet, Wireless LAN, Wi-Fi, mobile device networks, IEEE 802.11, GSM, GPRS, UMTS, 3G and 4G communications protocols, or any other network arrangement and/or protocol known to those having ordinary skill in the art.

Figure 2:
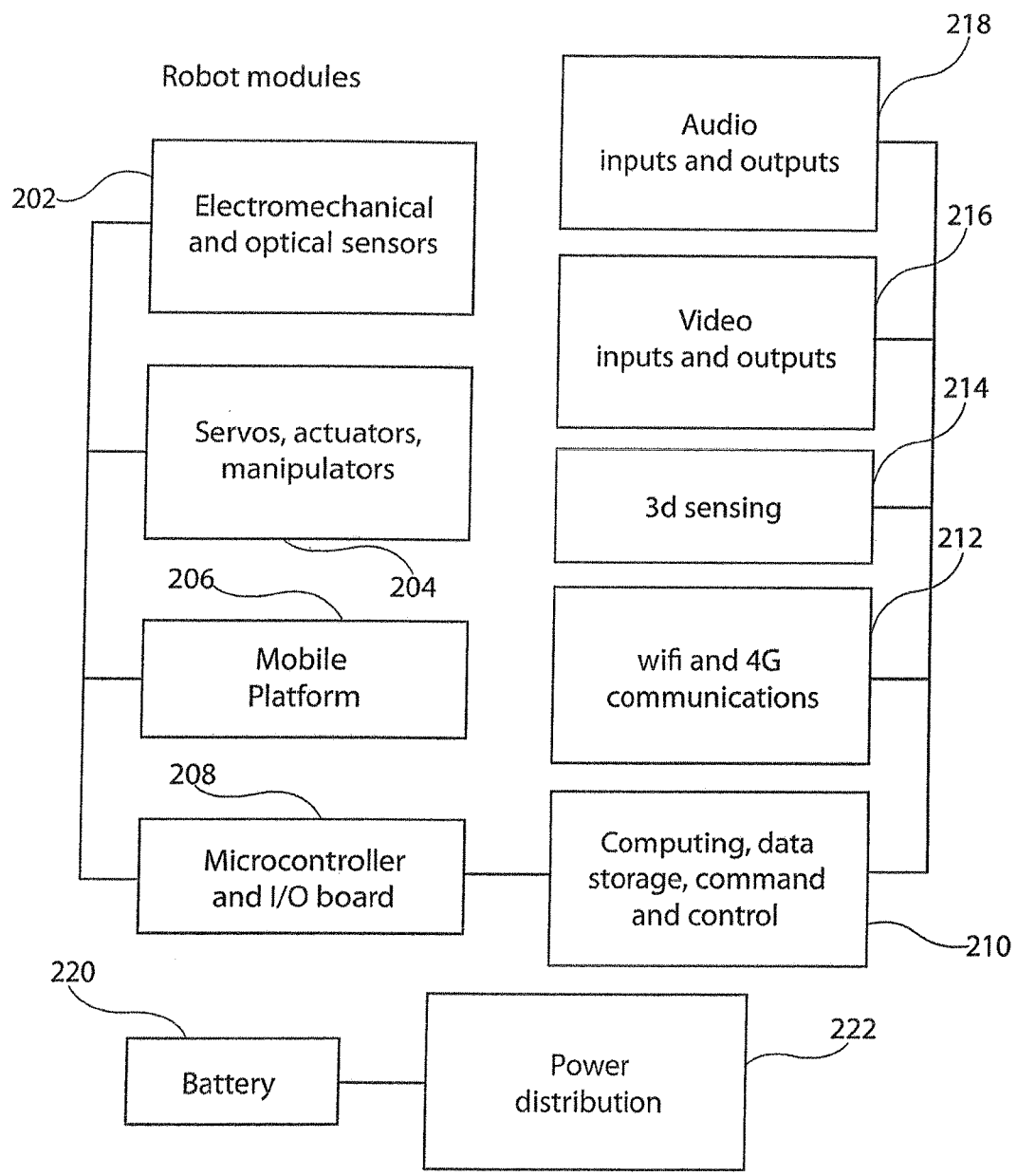
FIG. 2 is a block diagram which illustrates the modular architecture of a telepresence robot, in accordance with an embodiment of the disclosure.

FIG. 2 is a block diagram which illustrates some of the modular architecture of the telepresence robot 1. Each block of FIG. 2 represents a modular subsystem of the robot 1. The robot 1 includes electromechanical and optical sensors 202. These sensors include sensors which may be located on, and in communication with, the platform 206. Servos, actuators and manipulators 204 may further be included on the robot module, and communicate with the platform 206. A microcontroller and I/O board 208 is included on the robot module and communicates with the platform 206. The microcontroller and I/O board 208 further communicates with a computing, data storage, command and control module 210. Audio inputs and outputs 218, video inputs and outputs 216, 3D sensing 214 and wifi and 4G communications 212 modules all communicate with computing, data storage, command and control module 210. The robot 1 further includes a battery 220 which is associated with a power distribution module 222.

Control Station:

Referring back to FIG. 1, the control station 2 may include a camera 122, a control station computer 114 and a control station display 120. The camera 122 may be situated in such a manner as to sense at least the face of a human operator 80 and gestures made by the operator 80.

The control station 2 may further include a microphone 116 and a speaker 118. The computer 114 may also contain an input device 82 such as a joystick or a mouse. The control station 2 is typically located in a place that is remote from the robot 1. While only one robot 1 and one control station 2 are shown, one having ordinary skill in the relevant field will readily understand that the system 10 may include a plurality of robots 1 and/or a plurality of control stations 2.

The modular design allows the various parts and pieces to drop easily into position, so that setup does not require skilled labor. Also, by using 4G as the primary communications protocol, the need for remote information technology assistance may be eliminated; there is no need for a wifi link to a remote server, no need for special tunneling or firewall configuration, and no issues with wifi networks becoming overloaded and slow, as typically happens at scientific meetings. However, 4G is expensive for routine use, is not yet available everywhere, and currently does not penetrate deep inside buildings. Thus, the system may use standard wifi as the primary communications protocol.

By operating the control station 2, an operator 80 may control the telepresence robot 1, located remote from the control station 2. Control of the robot 1 may be accomplished with an input device 82 which communicates with the control station computer 114, such as a joystick, keyboard or other input device. Control signals may be received by the computer 114, from the input device 82, and transmitted to the robot 1, for example, through the network 101, the server 100, the network 103, wireless communication device 109, the robot computer 114 and then to the locomotion platform 12. Alternatively, the control station computer 114 may communicate with the robot 1 directly through network 101 and 103, which may be part of the same network. The robot 1 will move as desired, in response to the received control signal.

Video images captured by the camera 122 of the control station 2 may be transmitted to the robot 1 (e.g., over the network 3), where they may be displayed on the robot display 20. Audio signals also may be picked up by the control station microphone 116 and transmitted to the robot 1, where they may be broadcast by the speakers 18. Similarly, video and audio signals may be picked up by the robot 1 and transmitted to the control station 2. Thus, an operator 80 at the control station 2 may view images and hear audio of the remotely located robot's surroundings.

Two-way video chat with audio link may thus be performed between an operator 80 at the control station 2 and a remotely located person in communication with the robot 1. For example, the camera 22 of the robot 1 may capture video data of a person within the camera's field of view, and the microphone 16 may capture audio information from the person. This information is transmitted to the control station 2, where it may be output to the display 120 and/or speakers 118. At the same time, video and audio information from an operator 80 at the control station 2 may be captured by the camera 122 and the microphone 116, respectively, and transmitted to the robot 1, where it may be output to the display 20 and/or speakers 18. Well-known video and/or audio chat technologies (e.g., Skype, Google voice/video chat, and the like) are available and may be employed by the present invention. Alternatively, the present invention may utilize two-way video chat protocols that are platform-independent, do not require a public IP address, have no need for special tunneling or firewall configuration, do not require remote information technology assistance, and can be used with both Wi-Fi and 4G connections.

Figure 3:
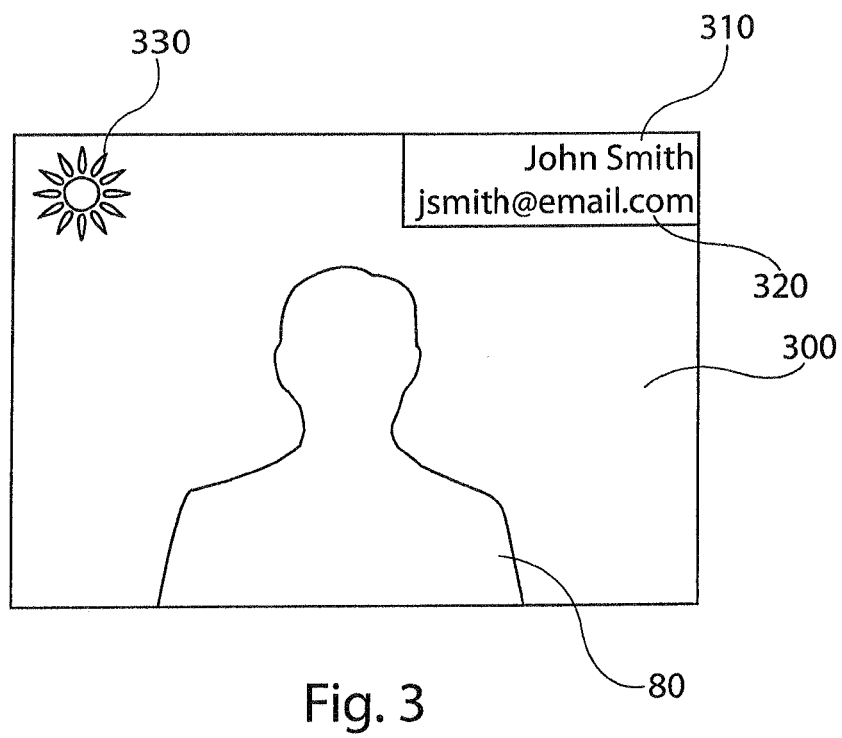
FIG. 3 is a graphical user interface view illustrating a telepresence communication feature, in accordance with an embodiment of the disclosure.

FIG. 3 is a graphical user interface (GUI) 300 that may be accessed and viewable from the robot display 20. The GUI 300 displays video data captured by the camera 122 at the control station 2. Audio data which is captured by the microphone 116 at the control station 2 may be output to the robot speakers 18 in synch with the video data. Moreover, further information relating to the robot operator 80, such as contextual identification information, may be included in the GUI 300. For example, the name 310 and email address 320 of the operator 80 may be overlaid on the video image of the operator 80.

While the GUI 300 shown in FIG. 3 provides a video-feed of the control station 2 to the robot display 20, the GUI 300 may also be available on the control station display 120, thereby displaying video data captured by the robot camera 22. The GUI 300 allows for two-way communication between the operator 80 and a person in a remote location, via the telepresence robot 1.

Indication of telepresence and/or teleoperation modes may be provided on the robot display 20. For example, the display 20 may display a telepresence indicator light 330 when the telepresence robot is being used. The light 330 may flash or "blink" when the telepresence robot is being operated by an operator 80 in a telepresence or teleoperation mode. As shown in FIG. 3, the blinking light 330 may appear on the GUI 300; however, the telepresence indicator light may be provided on any visible surface of the robot 1. Furthermore, an audible indication may be provided, for example through speakers 18, when the robot 1 is being operated.

In one embodiment, the camera 22 may detect the face of a person interacting with the robot 1, which may be transmitted to the robot computer 14, the control station computer 114, and/or the server 100. The captured video information may then be compared by a processor 24, 124 and/or 105 with reference facial expression image or video information which may have been previously recorded and stored, for example, in computer-readable memory 26, 126 in the robot computer 14, the control station computer 114, and/or in memory 107 in a network-accessible server 100. An emotional state may be predicted based on the comparison.

Moreover, the sensing of blood flow, pupillary response or dilation, respiration and heart rate, retinal patterns, and body fluid distribution of an observed person may be utilized to determine an emotional state of the observed person.

As discussed above, the camera 22 may detect the person's pupillary dilation and retinal patterns. A retinal scanner 66 may sense a person's retinal patterns. The infrared camera 44 or other thermal imaging device may sense the person's blood flow and body fluid distribution. The person's respiration may be sensed by the camera 22, for example, and the person's breathing patterns may be determined based on the visible expansion and contraction of the person's chest, or the movements of the person's nostrils while inhaling and exhaling. And, the person's heart rate may be sensed and determined, for example, based on information sensed by the camera 22, infrared camera 44 or electric potential sensors, as heart rate may be determined based on variations in skin brightness, variations in blood flow and/or displacement current using a capacitive coupling. These parameters are helpful in assessing both health and "state-of-mind" of the observed individual.

Information sensed by the camera 22, retinal scanner 66, infrared camera 44 and any other sensors of the present invention which may be utilized for sensing blood flow, pupillary dilation, respiration and heart rate, retinal patterns and/or body fluid distribution may be transmitted to the robot computer 14, the control station computer 114, and/or the server 100, and an emotional state of the observed person may be determined by executing an algorithm for determining an emotional state. For example, the infrared camera 44 may detect the face of a person interacting with the robot 1, which may be transmitted to the robot computer 14, the control station computer 114, and/or the server 100. FIGS. 4a and 4b show the camera 22 and infrared camera 44 images, respectively, of a person with an emotional state of, for example, happiness. FIGS. 4c and 4d show the camera 22 and infrared camera 44 images, respectively, of a person with an emotional state of, for example, anger. The infrared heat distribution of a person's face is captured by the camera, as shown in FIGS. 4b and d. The captured information may then be compared by a processor 24, 124 and/or 105 with reference infrared facial image or video information stored, for example, in computer-readable memory 26, 126 and/or 107 in the robot computer 14, the control station computer 114, and/or the server 100. An emotional state may be predicted based on the comparison.

In another embodiment, the detection of an emotional state may be determined from information received from the camera 22 and/or infrared camera 44 utilizing known principal component analysis (PCA) based techniques and/or known computer vision algorithms.

The algorithm for predicting an emotional state may further include known facial gesture recognition algorithms, as well as blood flow, pupillary dilation, respiration and heart rate, retinal patterns and/or body fluid distribution information. For example, the article "Automatic Prediction of Facial Trait Judgments: Appearance vs. Structural Models" (Mario Rojas Q., David Masip, Alexander Todorov, Jordi Vitria. *PLoS ONE*, 2011; 6 (8): e23323 DOI: 10.1371/journal.pone.0023323), the entirety of which is incorporated herein by reference, describes a method for detecting characteristics and emotional states (e.g., "attractive", "competent", "trustworthy", "dominant", "mean", "frightening", "extroverted", "threatening", "likeable", etc.) by detecting and analyzing facial gestures acquired through cameras. Furthermore, known facial expression imagery databases, such as the Surveillance Cameras Face Database (Mislay Grgic, Kresimir Delac, Sonja Grgic, SCface—surveillance cameras face database, Multimedia Tools and Applications Journal, Vol. 51, No. 3, February 2011, pp. 863-879), the entirety of which is incorporated herein by reference, may be utilized and expanded on in the present invention for recognition of emotional states.

The system 10 may further allow a single robot 1 to be accessed by more than one remote computer at the same time. For example, while there may be a single operator 80 at the control station 2 that controls the movements of the robot 1, the information captured by the robot 1, for example the video images captured by the camera 22 and the audio captured by the microphone 16, may be transmitted to a plurality of remote computers via the network 3. This is useful in any situation where there are a limited number of robots, including lectures and conferences. In such a situation, multiple people who wish to "attend" the lecture or conference through telepresence may log-in or otherwise obtain access to a single telepresence robot 1 that is physically located at the lecture or conference.

In another embodiment, the system 10 includes a scheduling system for sharing telepresence robots, which allows users to schedule robots for specific time slots and locations. For example, the robot computer 14 may include a schedule stored, for example, as a database in memory 26. An authorized user may log in or obtain access to the robot computer 14 and thereby access the schedule. The user may then schedule an available time for control of the robot 1. The user may further specify a location for the robot 1 to report to by the beginning of the scheduled time slot. The location information may be specified in any known terms, including for example, GPS coordinates. The robot 1 may then navigate autonomously to the specified location by the specified time, thereby saving the user the effort necessary to operate and drive the robot 1 from a first location. For example, the user may schedule the robot 1 to be at a conference room within a building at a specific time. The robot 1 may then autonomously navigate to the conference room, utilizing GPS coordinates and/or the location detector 68, from its starting position, which may be a charging or docking station.

The robot 1 may include a mixture of low- and high-level autonomous behaviors, such that an operator 80 may switch to a supervisory role and perform other tasks while the robot autonomously navigates. That is, the operator 80 may actively guide and control the robot's movements, or in a supervisory role, the operator 80 may merely supervise the robot's movements, while the robot 1 navigates autonomously to a specified location.

The system 10 may include privacy and security standards and protocols. For example, known log-in security and encrypted data transmission technologies may be utilized with the present invention. Furthermore, virtual boundaries may be present such that the robot cannot move outside of the boundaries. The boundaries may be programmed into the robot computer 14 as location information, such as GPS coordinates and the like. Using the robot location detector 68, the robot's location will be known, and if the robot's location approaches or exceeds the location of a virtual boundary, the robot 1 will not move further in that direction.

Figure 5:
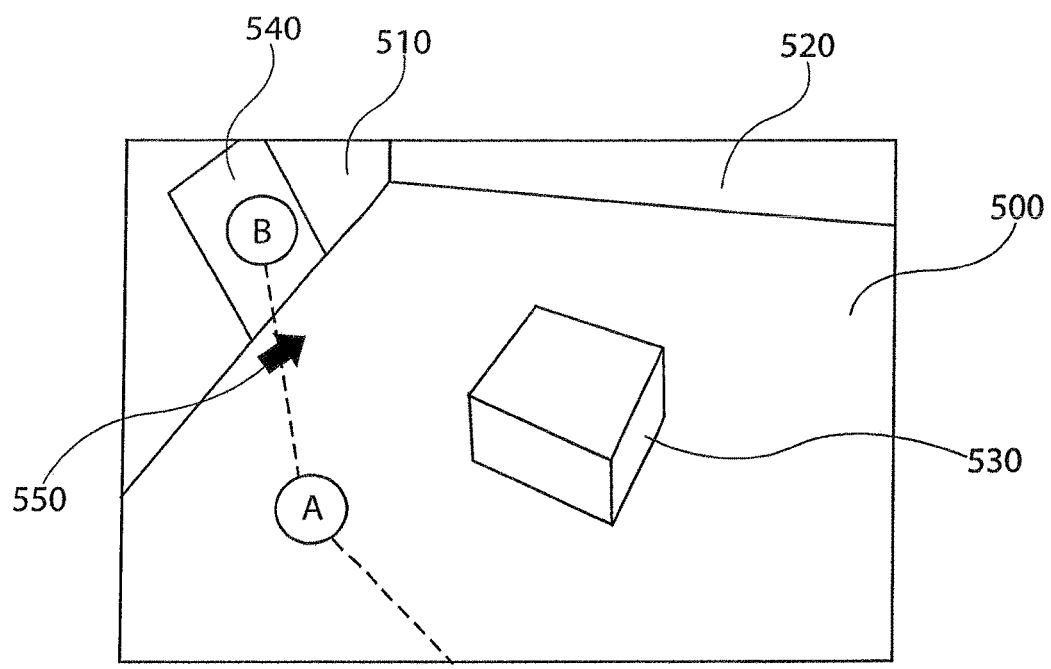
FIG. 5 is a graphical user interface view illustrating a "point and click" control feature, in accordance with an embodiment of the disclosure.

"Point and Click" Interface:

In one embodiment, an operator 80 at the control station 2 can control the robot 1 using a "point and click" interface. FIG. 5 illustrates a "point and click" GUI 500, which may be displayed on the control station display 120. The GUI 500 displays video images captured by the robot camera 22. In the example of FIG. 5, the video image displayed by GUI 500 includes a first wall 510, a second wall 520, an object 530, and an open doorway 540 along the first wall 510. A cursor 550 may be visible within the GUI 500, and may be controlled, for example as well known in the field of computers, by moving a mouse or other I/O device.

The interface allows the operator 80 to "point and click" on a location visible in the camera and the robot will move directly there. The operator 80 may point the cursor 550, for instance by moving a mouse, to a desired location within the video image, such as to the area denoted in FIG. 5 as "B", near the open doorway 540. The robot 1 will receive a control command from the control station computer 114, via the network 3, and will navigate in response to this command to the point "B" when the operator 80 clicks the mouse on that location. Various methods and techniques for causing the robot 1 to move to the desired location identified in the video image may be employed with the present invention. As an example, the robot 1 may operate in a mapped environment, such as an environment where GPS coordinates may be known. By clicking on a particular location within the video image, the GPS coordinates of the corresponding location in the mapped environment is sent to the robot 1, and the robot 1 will navigate to that location.

The operator 80 may be responsible for ensuring that no obstacles will impede the robot's path to the desired location. For example, the object 530 may be in the way of the robot's shortest path to the open doorway "B". Thus, the operator 80 may first click on the point "A", and when the robot 1 has moved to point "A" the operator 80 may then click on point "B". In another embodiment, the robot 1 may navigate directly to point "B" from its starting point, and utilize known object recognition techniques to avoid the object 530.

While the "point and click" interface has been described with a cursor 550 and a mouse or other input device, in another aspect, the GUI 500 may be displayed on a touch-screen display. Thus, rather than pointing a cursor and clicking a mouse, the operator 80 may simply touch the display 120 at the desired location and the robot 1 will move to that location.

Multi-Touch Gesture Interface:

In another embodiment of the present disclosure, an operator 80 may control the robot 1 utilizing gesture recognition technologies, which may include 2D and/or 3D gesture recognition systems. Recent work described by Mark Micire (Mark Micire, Ph.D. (2010). Multi-Touch Interaction For Robot Command And Control. Ph.D. Thesis. University of Massachusetts Lowell: USA), the entirety of which is incorporated herein by reference, demonstrates significant improvements in the use of natural gestures for commanding robot teams. Utilizing recent advances in robotics, mobile communication. and multi-touch, tabletop displays are bridging this technological gap and providing enhanced network-centric operation and increased mission effectiveness.

Figure 6:
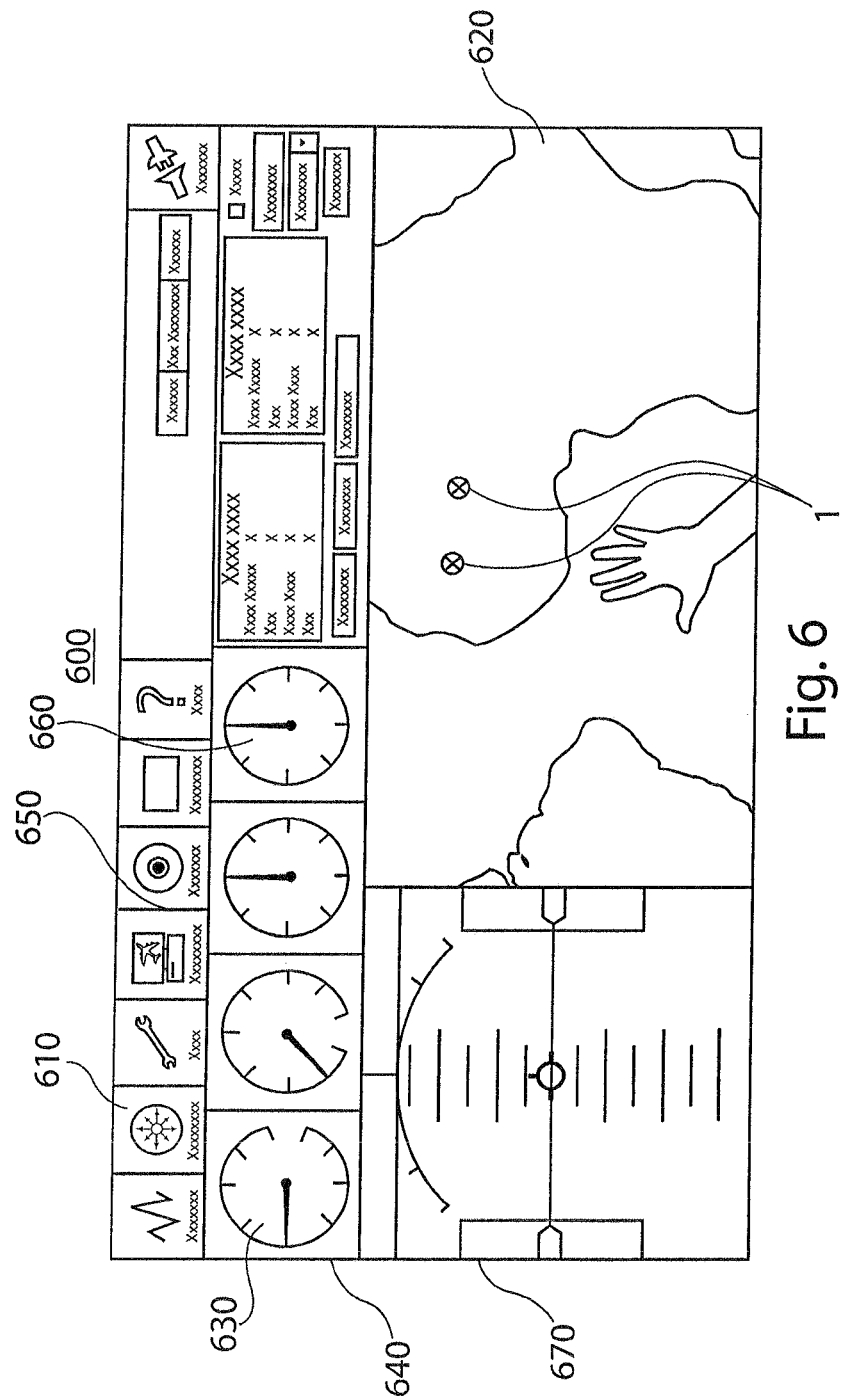
FIG. 6 is a gesture-enabled graphical user interface for monitoring and controlling telepresence robots, in accordance with an embodiment of the disclosure.

FIG. 6 illustrates a gesture-enabled interface 600, provided by the disclosure. The interface 600 may be provided on a multi-touch display, which may be, for example, the control station display 120 of system 10 in FIG. 1. The interface 600 may incorporate known gesture recognition technologies developed for multi-touch surface based tablets (e.g., Apple's iPad, Samsung's Galaxy, Motorola's Xoom, etc.) for semi-autonomous navigation and control of robots. The interface 600 may include selectable tabs 610, each of which, when selected, may provide a different view on the display 120. For example, the tab labeled "flight data" is selected in FIG. 6, thus providing the flight data display, as shown.

The interface 600 may be integrated with, and displayed overlaid on, one or more navigational maps 620. The map 620 may be provided based on known map data, satellite imagery or the like. For example, the map 620 may be provided by Google Maps, or some similar service. The location of the robots 1 may be detected by the use of a robot location detector 68 and may be transmitted over any network 3 to the control station 2, where it may be displayed on the interface 600.

The gesture-enabled interface 600 may include sensor feeds for each robot 1 and may display information received from the sensor feeds. In the case where the robot 1 is a UAV, for example, vertical speed 630, speed 640, altitude 650, heading 660 and latitude indication 670 may be received from corresponding sensors on the UAV and displayed on the interface 600. Robot health status information may further be displayed, which may include, for example, fuel levels which may be received from a fuel gauge, battery charge indication, and temperature which may be a temperature of a robot engine, battery, computer core, external environment or the like.

Augmented reality may be utilized to provide additional information and detail on the interface 600, for example on the map 620. Any known augmented reality techniques, for example as provided by Qualcomm's "augmented reality software development kit," may be employed for providing the augmented reality information and detail on the interface 600. The robots 1 may further utilize known Optical Character Recognition (OCR) and object recognition techniques. Video streams received from robots 1 may be labeled with objects identified by robots using optical character recognition (OCR) or object detection algorithms. The interface 660 may be developed and programmed using Google's Android operating system and Qualcomm's augmented reality software development kit.

Figure 7:
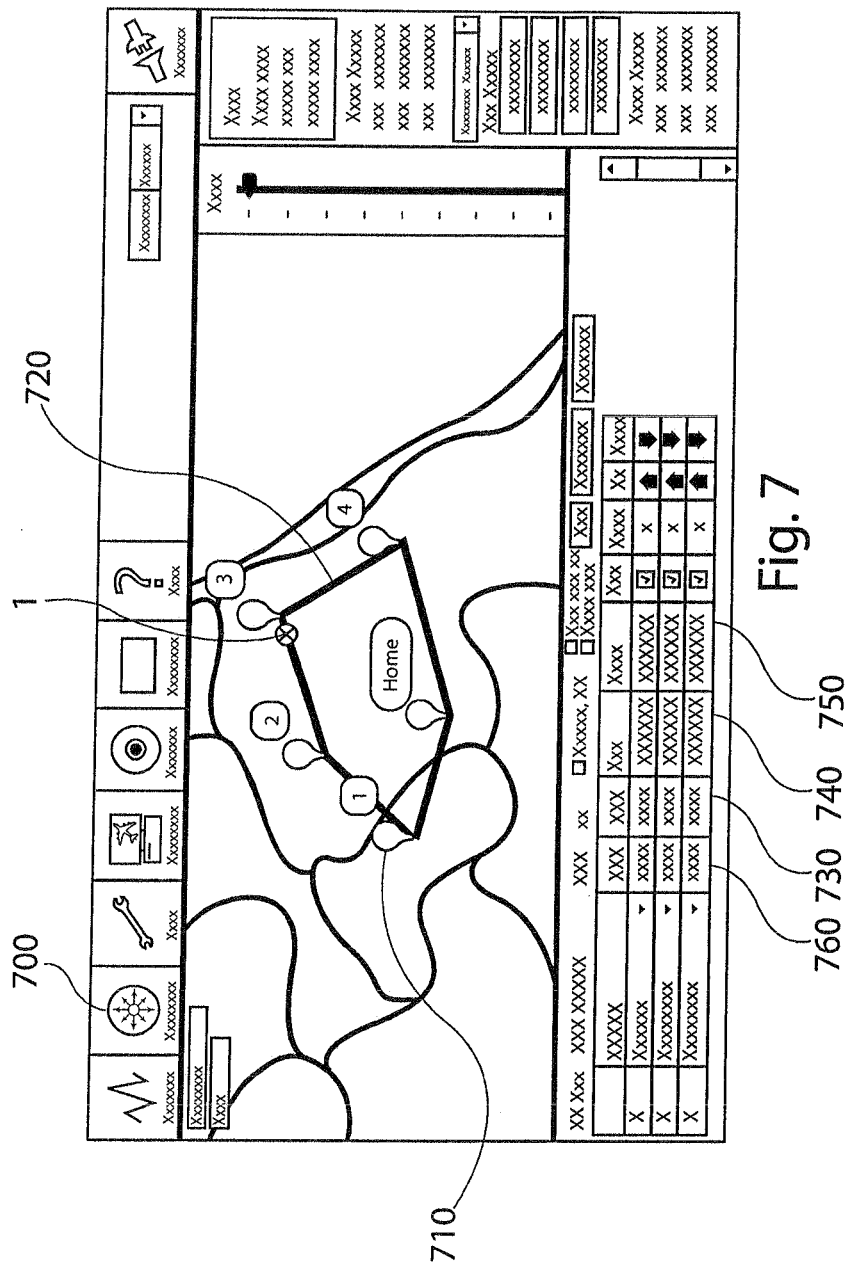
FIG. 7 is a further view of the graphical user interface of FIG. 6, in accordance with an embodiment of the disclosure.

FIG. 7 illustrates a further feature of the gesture-enabled interface 600 of FIG. 6, when the "flight planner" tab 700 is selected. The "flight planner" tab 700 allows an operator 80 to program a travel plan (e.g., a flight plan) for one or more robots, such as a UAV 1. The travel plan may be programmed by creating waypoints 710 and specifying waypoint data for each waypoint in the respective waypoint column. The waypoints 710 may define a travel path 720 for the robot 1. As shown in FIG. 7, the waypoint data may include altitude information 730, latitude information 740, longitude information 750 and a specified delay 760 for each waypoint. The waypoint information may include GPS coordinates.

Figure 8:
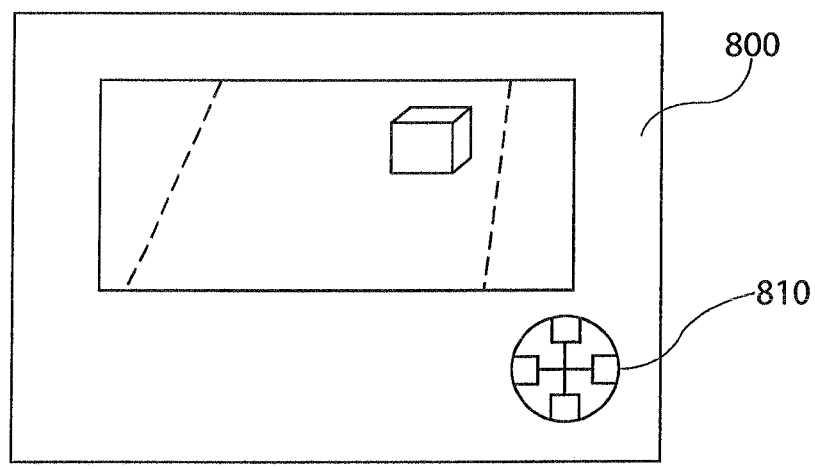
FIG. 8 is a block diagram which illustrates a gesture-enabled interface for controlling a robot with a virtual controller, in accordance with an embodiment of the disclosure.

FIG. 8 illustrates a block diagram of a gesture-enabled interface 800 for controlling a robot 1, for example, in the system 10. The gesture enabled interface 800 includes a multi-touch display, which may be, for example, the control station display 120 of system 10 in FIG. 1. An operator 80 may command individual or multiple robots 1 through a gesture set designed to maximize ease of learning. The multi-touch display 120 may include a robot controller 810, which may be a virtual controller that is displayed on the display 120. For example, the controller 810 may be a virtual controller that is capable of changing its size and orientation utilizing algorithms for fast hand detection, finger registration, and handedness registration, as described in "Multi-Touch Interaction For Robot Command And Control" (Mark Micire, Ph.D. (2010). Multi-Touch Interaction For Robot Command And Control. Ph.D. Thesis. University of Massachusetts Lowell: USA), the entirety of which is incorporated herein by reference.

Gesture Recognition Interface:

Referring back to FIG. 1, the control station camera 122 may be configured to sense operator gestures including, but not limited to: head position and motion, face pose, position and motion, shoulder and arm position and motion, postural adjustments, gaze, eye position and motion, torso position and motion and leg position and motion. The control station camera 122 may be mounted at any desired position.

The control station 2 may further include a 3D sensor 142. The 3D sensor 142 may be a 3D video camera, a laser rangefinder, any 3D scanner, structured light scanner, stereo cameras, ultrasound, radar, lidar or any other sensing or scanning devices for detecting 3D static and/or dynamic movements. The 3D sensor 142 may be an infrared structured light-based sensor, such as the Microsoft Kinect, which provides good quality 3D sensing at a comparatively low cost.

The camera 122 and/or the 3D sensor 142 is positioned in a manner to detect gestures made by an operator 80 at the control station 2. In one embodiment, the detected gestures may be compared with image or video data of human gestures which may have been previously recorded and stored in a gesture database in memory 26, 126 and/or 107 in the robot computer 14, the control station computer 114 and/or the server 100. The stored information may include image and/or video data of various human gestures.

Gestures which will be recognized and used by the system 10 may be developed using the camera 122 and/or the 3D sensor 142 with, for example, open source libraries such as the DTW Gesture Recognition toolkit. The gestures stored in the database in memory 26, 126 and/or 107 may be linked to control commands for the robot 1. For example, a gesture of "walking in place" may be linked to a command which causes the robot 1 to move forward. "Jogging in place" may be linked to a command which causes the robot to increase its speed; pointing in a particular direction may be linked to a command which causes the robot to rotate in that direction; a gesture of moving the operator's head may be linked to a command that causes the pan and tilt base 40 to move the camera 22 in the direction of the head movement; turning may cause the robot 1 to turn in the same direction, and so on.

In operation, the processor 24, 124 and/or 105 receives information detected by the camera 122 and/or the 3D sensor 142 and determines whether one of the set of robot control gestures has been detected based on a comparison of the information detected by the camera 122 and/or sensor 142 with the information stored in memory 26, 126 and/or 107. The gestures made by the operator 80 are sent to the processor 24, 124 and/or 105 which executes an algorithm to compare the information received from the camera 122 and/or sensor 142 with the gesture information stored in memory 26, 126 and/or 107. When a gesture detected by the camera 122 and/or sensor 142 matches a recognized gesture stored in memory 26, 126 and/or 107, the processor 24, 124 and/or 105 may issue a particular robot control command which may be associated with the detected gesture. For example, if the camera 122 and/or sensor 142 detects an operator 80 walking in place, the processor 24, 124 and/or 105 will execute a comparison algorithm to compare the detected image and/or video with the gesture information stored in memory 26, 126 and/or 107. The detected gesture will match with a prerecorded gesture for walking in place stored in memory 26, 126 and/or 107, and the processor 24, 124 and/or 105 may then issue a control command to the robot 1 which may, for example, cause the robot 1 to move forward.

Both 2D and 3D gestural interfaces foster collaboration and reduce cognitive load. This helps controllers make efficient tactical decisions for robots.

3D gestures may be incorporated into any of the interfaces described herein. By using, for example, Qualcomm's augmented reality software development kit, the interface may include an overlaid gesture controller, optical character recognition, maps and satellite feeds on top of robot video streams, sensor feeds and telemetry.

The system 10 may be configured to handle interaction with multiple people, such as a crew in a command center or living quarters. However, in such an environment where multiple people and/or multiple 3D sensors 142 may be present, certain 3D sensors 142 such as the Kinect may be limited due to their method of gathering 3D information from structured light. As a result, the system 10 may display a pattern of light on the objects that it is measuring in the scene, and this light can interact between multiple Kinects. Prior techniques have overcome some of these challenges, with the result of supporting multi-user environments in homes and offices. Other research has explored augmentation of visual response by wearable sensors; for example, flexible and stretchable bend sensors that can be integrated into clothing (e.g., A. Kirk, C. Ho, D. Garmire, "Surface-Shape Capture with Boundary Electrodes," In the Proceedings of IEEE Sensors 2010 Conference, Hawaii, Nov. 1-Nov. 4, 2010, pp. 1803-1808, the entirety of which is incorporated herein by reference). A combination of these techniques may be employed with the present system 10 to overcome line-of-sight issues in crowded environments.

The control station 2 may further detect an emotional state of the operator 80. For example, the control station 2 may include algorithms similar to those described above with respect to emotion prediction for a person interacting with the robot 1. That is, the camera 122 may detect the face of the operator 80, which may be transmitted to the robot computer 14, the control station computer 114 and/or the server 100. The captured video information may then be compared by a processor 24, 124 and/or 105 with reference facial expression image or video information which may have been previously recorded and stored, for example, in computer-readable memory 26, 126 and/or 107 in the robot computer 14, the control station computer 114, and/or the server 100. An emotional state may be predicted based on the comparison.

Moreover, the sensing of blood flow, pupillary response or dilation, respiration and heart rate, retinal patterns, and body fluid distribution of an operator 80 may be utilized to determine an emotional state of the operator 80.

The camera 122 may detect the operator's pupillary dilation and retinal patterns. A retinal scanner 166 may sense the operator's retinal patterns. The infrared camera 144 or other thermal imaging device may sense the operator's blood flow and body fluid distribution. The operator's respiration may be sensed by the camera 122, for example, and the operator's breathing patterns may be determined based on the visible expansion and contraction of the operator's chest, or the movements of the operator's nostrils while inhaling and exhaling. And, the operator's heart rate may be sensed and determined, for example, based on information sensed by the camera 122, infrared camera 144 or electric potential sensors, as heart rate may be determined based on variations in skin brightness, variations in blood flow and/or displacement current using a capacitive coupling.

Information sensed by the camera 122, retinal scanner 166, infrared camera 144 and any other sensors of the present invention which may be utilized for sensing blood flow, pupillary dilation, respiration and heart rate, retinal patterns and/or body fluid distribution may be transmitted to the robot computer 14, the control station computer 114, and/or the server 100, and an emotional state of the operator 80 may be determined by comparison with reference information, PCA, facial expression and recognition techniques and/or any other technique described herein.

Gesture Repository:

The gesture information may be stored in and accessed from a gesture repository, which may be an open-source repository. Such an open source, community-driven gesture platform for a variety of disparate devices, may ultimately result in a universal gesture language for human-robot communication interfaces and even robot-human communication in case of gesture-enabled robots.

Thus, software libraries and a gesture repository may be created that allow crew members and ground controllers to command autonomous and semi-autonomous robots using collaborative, intuitive interfaces with simple training and reduced cognitive overload.

Figure 9:
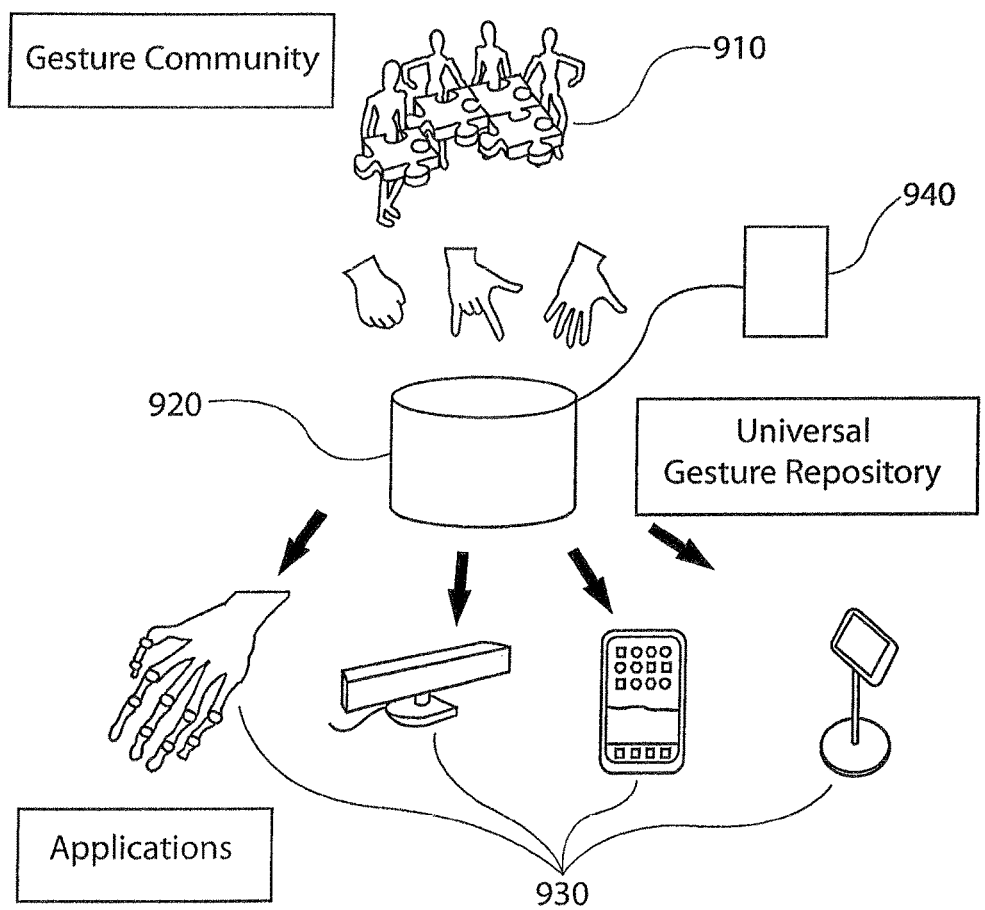
FIG. 9 is a block diagram which illustrates a gesture repository, in accordance with an embodiment of the disclosure.

As shown in FIG. 9, members of a gesture development community 910 may develop and add to the universal gesture repository 920, which may be used by a variety of gesture-based applications 930. The community 910 may include certain developers, research labs, members of academia, open source communities, industry and commercial entities. The community 910 may select universal gestures for inclusion in the repository 920 based on their context, ease of use, relevance to the task, and cross-cultural meaning.

Similar endeavors include "SDK DTW Gesture Recognition Kinect" and the Georgia Tech Gesture Toolkit, which extends the Cambridge University's "Speech Recognition Toolkit." The universal gesture repository 920 may incorporate these and other such gesture toolkits for building easy-to-use APIs, facilitating rapid feedback and simplifying mass adoption.

The universal gesture repository 920 may allow for the standardization of gestures across various disparate devices, including touch interfaces, 3D sensors, etc., and allows for such gestures to control and interact with semi-autonomous and autonomous robots.

A grammar for gestures akin to natural spoken languages may be developed and utilized in the repository 920, thus providing building blocks such as subject, object and predicate.

Access to the repository 920 may be provided through a web portal 940, which may require log-in or other approved identification information. New gestures which are proposed or introduced to the repository 920 may be voted on by members of the community 910. For example, members of the community 910 may receive an email or other electronic notification, which may be generated by the web portal 940, when a new gesture has been proposed for inclusion in the repository 920. Furthermore, members of the community 910 can rank gestures based on popularity or usefulness.

The gesture repository 920 may be made available for integration into any machine interfaces, including interfaces used in the gaming industry. The repository 920 may be used as a source of advertisement-generated revenue, as the web portal may use targeted advertisements to generate revenue.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of the present disclosure and protected by the following claims.

REFERENCES

Each of the following references are incorporated herein by reference, in their entirety:

1. Katherine M. Tsui, Adam Norton, Daniel Brooks, Holly A. Yanco, and David Kontak. Designing Telepresence Robot Systems for Use by People with Special Needs. Proceedings of the International Symposium on Quality of Life Technologies 2011: Intelligent Systems for Better Living, held in conjunction with RESNA 2011 as part of FICCDAT, Toronto, Canada, Jun. 6-7, 2011.
2. Munjal Desai, Katherine M. Tsui, Holly A. Yanco, and Chris Uhlik. Essential Features of Telepresence Robots. Proceedings of the IEEE International Conference on Technologies for Practical Robot Applications, Woburn, Mass., April 2011.
3. Katherine M. Tsui, Munjal Desai, Holly A. Yanco, and Chris Uhlik. Telepresence Robots Roam the Halls of My Office Building. Human-Robot Interaction (HRI) Workshop on Social Robotic Telepresence, Lausanne, Switzerland, Mar. 6-9, 2011.
4. Katherine M. Tsui, Munjal Desai, Holly A. Yanco, and Chris Uhlik. Exploring Use Cases for Telepresence Robots. Proceedings of the 6th ACM/IEEE International Conference on Human-Robot Interaction, Lausanne, Switzerland, Mar. 6-9, 2011.
5. Mark Micire, Munjal Desai, Amanda Courtemanche, Katherine M. Tsui, and Holly A. Yanco. 2009. Analysis of natural gestures for controlling robot teams on multi-touch tabletop surfaces. In *Proceedings of the ACM International Conference on Interactive Tabletops and Surfaces* (ITS '09). ACM, New York, N.Y., USA, 41-48.
6. Shangfei Wang; Zhilei Liu; Siliang Lv; Yanpeng Lv; Guobing Wu; Peng Peng; Fei Chen; Xufa Wang; "A Natural Visible and Infrared Facial Expression Database for Expression Recognition and Emotion Inference," *Multimedia, IEEE Transactions on*, vol. 12, no. 7, pp. 682-691, November 2010
7. Mislay Grgic, Kresimir Delac, Sonja Grgic, SCface—surveillance cameras face database, Multimedia Tools and Applications Journal, Vol. 51, No. 3, February 2011, pp. 863-879
8. Lora G Weiss, "Autonomous Robots in the fog of war" IEEE Spectrum, Vol 48 number 10, August 2011, pp. 30-34, 56-57
9. Mark Micire, Ph.D. (2010). Multi-Touch Interaction For Robot Command And Control. Ph.D. Thesis. University of Massachusetts Lowell: USA
10. S. Thrun et. al, Stanley: The Robot That Won the DARPA Grand Challenge." Springer Tracts in Advanced Robotics: The 2005 Grand Challenge, 36:1 {43, 2007
11. Mario Rojas Q., David Masip, Alexander Todorov, Jordi Vitria. Automatic Prediction of Facial Trait Judgments: Appearance vs. Structural Models. *PLoS ONE*, 2011; 6(8): e23323 DOI: 10.1371/journal.pone.0023323
12. Kenneth Cukier, The data deluge, Cover Story, The Economist, Feb. 27, 2010 http://www.economist.com/node/15579717
13. Saenz-Otero, A, Miller D W, "SPHERES: a platform for formation-flight research", SPIE Optics & Photonics Conference, San Diego, Calif., August 2005
14. http://inhabitat.com/team-hawaii-withdraws-from-solar-decathlon-competition-despite-amazing-design/
15. A. Kirk, C. Ho, D. Garmire, "Surface-Shape Capture with Boundary Electrodes," In the Proceedings of IEEE Sensors 2010 Conference, Hawaii, Nov. 1-Nov. 4, 2010, pp. 1803-1808.
16. Qualcomm augmented reality SDK https://developer.qualcomm.com/develop/mobile-technologies/augmented-reality
17. Google's Android Operating System http://developer.android.com/index.html
18. DIY Drones http://www.wired.com/dangerroom/2011/05/is-darpa-recruiting-wireds-editor-to-build-drones/
19. R. O. Ambrose, H. Aldridge, R. S. Askew, R. R. Burridge, W. Bluethmann, M. Diftler, C. Lovchik, D. Magruder, and F. Rehnmark. Robonaut: NASA's Space Humanoid." IEEE Intelligent Systems, 15:57 {63, 2000,
20. J. Gyor, E. Buhrke, M. Tarlton, J. Lopez, and G. Valliath. Applying Telepresence to Incident Management: The Virtual Incident Command Center." Presence: Teleoperators & Virtual Environments, 17(3):231 {241, 2008.

What is claimed is:

1. A telepresence robot comprising:
   a mobile platform;
   a first robot camera; and
   a computer in communication with the platform and the first robot camera, said computer having a processor and computer-readable memory,
   wherein said computer is configured to receive video information from at least one remotely located camera and sensed 3D information from at least one remotely located 3D sensor, the video information and sensed 3D information signifying a physical body gesture made by a remotely-located human operator, and wherein said telepresence robot is configured to perform an imitating action of the physical body gesture made by the remotely-located human operator, and
   wherein said computer is further configured to receive video information from the first robot camera comprising a video image of a person interacting with the telepresence robot and to predict an emotional state of the person based on the received video information.

2. The telepresence robot of claim 1, further comprising an infrared camera and/or biometric sensor, wherein said computer is further configured to receive information from the infrared camera and/or biometric sensor relating to the person and to predict an emotional state of the person based on the information received from the first robot camera and the infrared camera.

3. The telepresence robot of claim 2, further comprising a retinal scanner configured to scan the eyes of the person interacting with the telepresence robot, wherein said computer is further configured to receive information from the retinal scanner and to predict an emotional state of the person based on the information received from the first robot camera, the infrared camera and the retinal scanner.

4. The telepresence robot of claim 1, further comprising:
   a robot display;
   a robot microphone; and
   a robot speaker,
   wherein said computer is further in communication with the display, microphone and speaker.

5. The telepresence robot of claim 4, further comprising a second robot camera, wherein said first robot camera is disposed on a pan and tilt base, and the second robot camera is provided in a fixed position with a downward view.

6. The telepresence robot of claim 4, wherein the display is a touchscreen display.

7. The telepresence robot of claim 4, wherein said computer is configured to receive video information from the at least one remotely located camera and audio information from at least one remotely located microphone, and to display the received video information on the robot display, project the received audio information from the speaker, and to transmit information received from the first robot camera and the robot microphone to a remotely located computer.

8. The telepresence robot of claim 7, wherein said computer is further configured to receive an email address and a name of an operator of the remotely located computer, and to display the received email and name on the robot display.

9. The telepresence robot of claim 1, further comprising a 3D sensor.

10. The telepresence robot of claim 9, wherein the 3D sensor comprises at least one of a 3D video camera, a laser rangefinder, a 3D scanner, a structured light scanner, a stereo camera, an ultrasound sensor, a radar detector, a Doppler radar sensor, and a lidar detector.

11. The telepresence robot of claim 9, further comprising at least one of a tactile sensor, a cliff sensor, a bump sensor, a humidity sensor, a chemical sensor, a vibration sensor, an ultraviolet sensor, an ultrasonic sensor, and a temperature sensor.

12. The telepresence robot of claim 1, further comprising a robot location detector.

13. The telepresence robot of claim 12, wherein said computer-readable memory is configured to store scheduling information for the telepresence robot, said scheduling information including time and location information, wherein said computer is configured to access said scheduling information and to cause the telepresence robot to navigate to a specified location at a specified time based on said scheduling information.

14. A telepresence robot system comprising:
a telepresence robot having a mobile platform, a robot camera, a robot display, and a robot computer in communication with the platform and the robot camera, said robot computer having a processor and computer-readable memory; and
a control station located remote to the telepresence robot, said control station having a control station camera, a control station 3D sensor, a control station display, and a control station computer in communication with the control station camera and control station display, said control station computer having a processor and computer-readable memory;
wherein said control station camera and said control station 3D sensor are configured to detect video information and 3D sensed information signifying physical body gesture made by a human operator, and wherein said telepresence robot is configured to perform an imitating action of the detected physical body gesture, and
wherein said control station computer is further configured to receive video and/or biometric information from the control station camera and/or a biometric sensor relating to the human operator and to predict an emotional state of the operator based on the received information, and wherein the video and/or biometric information used to predict the emotional state of the operator comprises at least one of the following: pupillary dilation, retinal patterns, blood flow, body fluid distribution, respiration, nostril movement, heart rate, and skin brightness.

15. The telepresence system of claim 14, wherein said control station computer is configured to receive video information from the control station camera relating to a gesture made by the human operator, and the control station processor causes the telepresence robot to operate based on said detected gesture.

16. The telepresence system of claim 14, wherein said robot computer is configured to receive video information from the control station camera relating to a gesture made by the human operator, and the robot processor causes the telepresence robot to operate based on said detected gesture.

17. The telepresence system of claim 14, wherein said control station further comprises an infrared camera, wherein said control station computer is further configured to receive information from the infrared camera relating to the human operator and to predict an emotional state of the operator based on the information received from the control station camera and the infrared camera.

18. The telepresence system of claim 14, wherein the control station display is a touchscreen display.

19. The telepresence system of claim 14, wherein said control station further comprises a 3D sensor.

20. The telepresence system of claim 19, wherein the 3D sensor comprises at least one of a 3D video camera, a laser rangefinder, a 3D scanner, a structured light scanner, a stereo camera, an ultrasound sensor, a radar detector, a Doppler radar sensor, and a lidar detector.

21. The telepresence system of claim 14, wherein said control station computer is configured to receive video information from a remotely located robot camera and audio information from a remotely located robot microphone, and to display the received video information on the control station display, project the received audio information from a control station speaker, and to transmit information received from the control station camera and a control station microphone to a remotely located robot computer.

22. The telepresence system of claim 21, wherein said control station computer is further configured to receive an email address and a name of a person interacting with the remotely located robot, and to display the received email and name on the control station display.

23. A telepresence robotic system comprising:
a telepresence robot having a mobile platform, a robot camera, a robot display, and a robot computer in communication with the platform and the robot camera, said robot computer having a processor and computer-readable memory; and
a control station located remote to the telepresence robot, said control station having a control station camera, a control station display, and a control station computer in communication with the control station camera and control station display, said control station computer having a processor and computer-readable memory;
wherein said control station computer receives video information from the robot camera and displays the received video information as a video image on the control station display, wherein said control station computer is configured to receive an input signal relating to a selection of a particular location in the video image on the control station display, and wherein said telepresence robot is configured to navigate to a particular location based on said selection.

* * * * *